(12) United States Patent
Ribaldone et al.

(10) Patent No.: US 7,445,101 B2
(45) Date of Patent: Nov. 4, 2008

(54) SYSTEM AND METHOD FOR REVERSING THE MOVEMENT OF A VEHICLE, IN PARTICULAR FOR AN AGRICULTURAL TRACTOR

(75) Inventors: Massimo Ribaldone, Pontirolo Nuovo (IT); Bruno Paggi, Treviglio (IT)

(73) Assignee: Same Deutz-Fahr Group SpA, Bergamo (IT)

( * ) Notice: Subject to any disclaimer, the term of this patent is extended or adjusted under 35 U.S.C. 154(b) by 284 days.

(21) Appl. No.: 11/241,360

(22) Filed: Sep. 29, 2005

(65) Prior Publication Data

US 2006/0096824 A1    May 11, 2006

(30) Foreign Application Priority Data

Nov. 9, 2004    (EP) .................................. 04425833

(51) Int. Cl.
*F16H 61/00*    (2006.01)
*F16D 67/02*    (2006.01)

(52) U.S. Cl. .................................... 192/13 R; 192/218
(58) Field of Classification Search ........................ None
See application file for complete search history.

(56) References Cited

U.S. PATENT DOCUMENTS

| | | | | |
|---|---|---|---|---|
| 4,311,068 A | * | 1/1982 | Chatterjea | .................... 475/64 |
| 5,522,779 A | * | 6/1996 | Tabata et al. | ................ 477/126 |
| 5,807,207 A | * | 9/1998 | Hisano et al. | ................ 477/116 |
| 6,782,961 B1 | * | 8/2004 | Ishikawa et al. | ............ 180/197 |
| 2004/0127320 A1 | | 7/2004 | Inoue et al. | |
| 2004/0180753 A1 | * | 9/2004 | Takamura et al. | ............. 477/94 |

FOREIGN PATENT DOCUMENTS

| | | |
|---|---|---|
| EP | 0 475 918 A2 | 3/1992 |
| EP | 0 640 780 A2 | 3/1995 |
| EP | 0 811 792 A2 | 12/1997 |
| JP | 2001114087 | 4/2001 |

OTHER PUBLICATIONS

European Search Report from EP Application No. 04425833.3, Dated Apr. 7, 2005.

* cited by examiner

*Primary Examiner*—Rodney H Bonck
(74) *Attorney, Agent, or Firm*—Patterson & Sheridan L.L.P.

(57) ABSTRACT

System for reversing the movement of a vehicle, in particular for an agricultural tractor, comprising an electro-hydraulic reverser including a hydraulic clutch and a valve assembly able to activate the clutch in conditions of forward travel or of rearward travel and able to modulate the engagement of the clutch, a control member which can be operated by the driver to select an operative condition of the reverser selected among: neutral, forward travel, and rearward travel, and an electronic control unit adapted to receive a first signal indicating the position of the control member, a second signal indicating the operative state of a braking system of the vehicle, and a third signal indicating the speed of the vehicle, the electronic control unit being adapted to control the valve assembly according to said first, second and third signal.

10 Claims, 14 Drawing Sheets

SYSTEM AND METHOD FOR REVERSING THE MOVEMENT OF A VEHICLE, IN PARTICULAR FOR AN AGRICULTURAL TRACTOR

CROSS-REFERENCE TO RELATED APPLICATIONS

This application claims benefit of European Patent Application serial number EP04425833.3, filed Nov. 09, 2004, which is herein incorporated by reference.

BACKGROUND OF THE INVENTION

1. Field of the Invention

The present invention relates to a system and method for reversing the movement of a vehicle. The present invention was developed with particular regard to agricultural tractors provided with electro-hydraulic reversers.

2. Description of Related Art

An electro-hydraulic reverser for an agricultural tractor usually comprises a hydraulic clutch, a two-way electrical valve of forward travel, a two-way electrical valve of rearward travel, and a proportional modulation electrical valve. In the control cab of the vehicle is provided a control member which can be operated by the driver to select an operative condition of the reverser selected among: neutral, forward travel, rearward travel.

With this type of electro-hydraulic reverse, currently present on some agricultural tractors produced by the Applicant, the direction of travel can be changed by acting solely on the control member (usually positioned under the steering wheel) without using the clutch pedal. This known reversal system allows to obtain a forward-backward movement of the vehicle without using the clutch pedal and the transmission and therefore it allows to increase the speed of the reversal operation and to enhance comfort for the operator.

However, there are tasks that require a temporary stop of the vehicle before the reversal of travel. For example, when the vehicle operates with a loading shovel, before reversing the direction of travel it is necessary to stop the vehicle, e.g. to allow the shovel to load or unload material.

With traditional reversal systems, the driver is therefore forced to act on the clutch pedal in order to stop temporarily the tractor. This operation can become dangerous when the vehicle works on non level terrain. In this case, the driver must simultaneously act on the clutch pedal and on the brake pedals to stop the vehicle. This allows the operator to perform combined and more complex operations, which are certainly not comfortable and which require greater attention.

SUMMARY OF THE INVENTION

The object of the present invention is to provide a system and a method for reversing the direction of travel, which allow to overcome said problems.

According to the present invention, said object is achieved by a system and by a method for reversing the direction of travel having the characteristics set out in the claims.

The system according to the present invention comprises an electronic control unit which processes information received from the reverser control member (positioned for example under the steering wheel of the vehicle), from the braking system and from a sensor (positioned for example in the lower part of the transmission) able to record the velocity of advance of the vehicle. Based on the received signals, the electronic control unit interprets the user's requests and, in relation thereto, it commands the increase or decrease of the pressures inside the chambers of the clutch of the hydraulic reverser, modulating the transmission of power automatically without need for the user to act on the clutch pedal.

With the system according to the present invention, the operator needs only to act on the brake pedals to obtain the braking of the machine and simultaneously to place the reversal operation in standby. Raising the foot from the brake pedals, the system according to the invention re-enables the temporarily suspended reversal operation, assuring a progressive and modulated engagement of the clutch managed directly by the electronic unit.

BRIEF DESCRIPTION OF THE DRAWINGS

The characteristics and the advantages of the system and of the method according to the invention shall become readily apparent in the detailed description that follows, provided purely by way of non limiting example, with reference to the accompanying drawings, in which.

Figure 1:
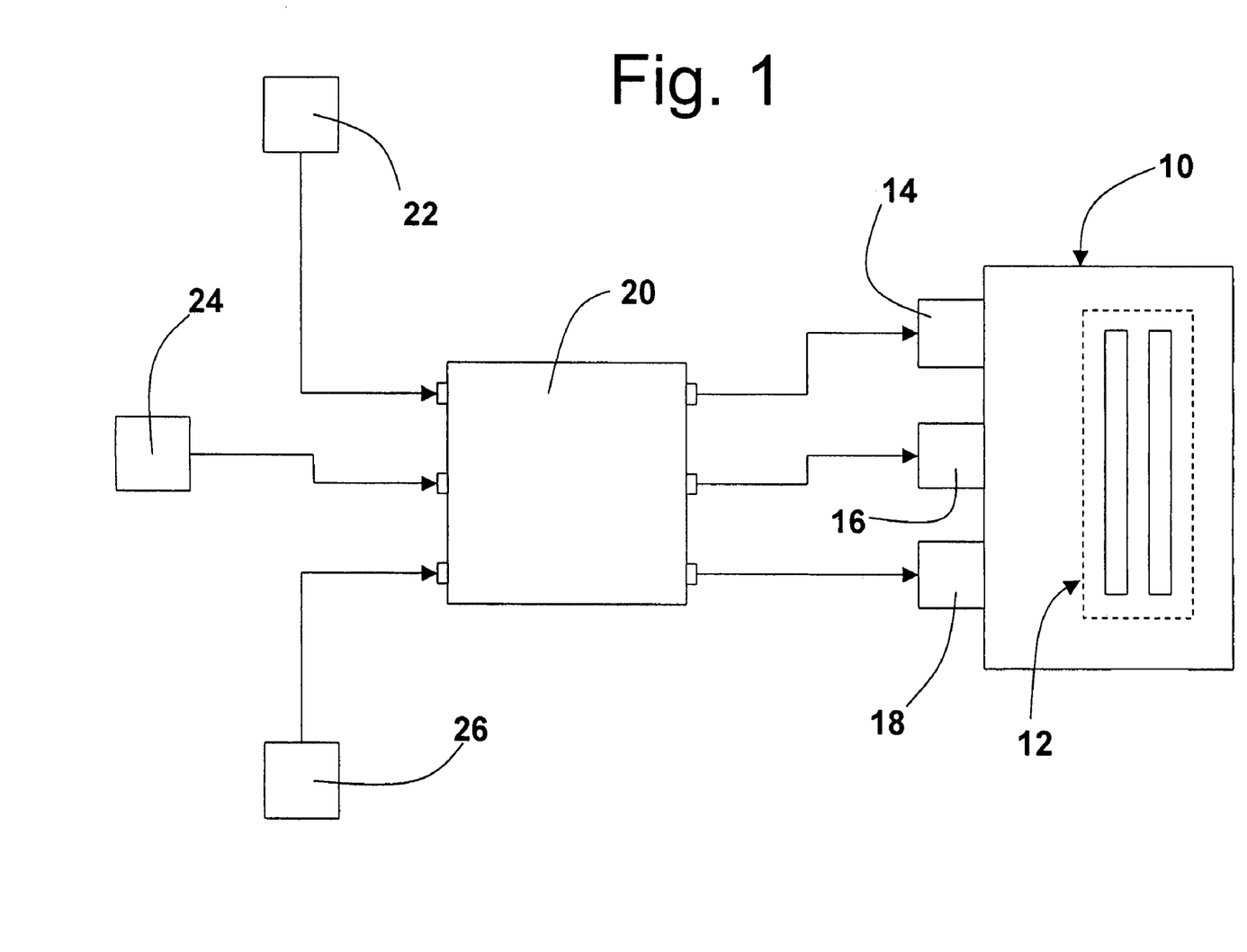
FIG. 1 is a block diagram of a system according to the invention.

The movement reversal system according to the present invention comprises an electro-hydraulic reverser 10 including a hydraulic clutch 12, a two-way electrical valve of forward travel 14, a two-way electrical valve of rearward travel 16, and a proportional modulation electrical valve 18.

The three electrical valves are controlled by an electronic control unit 20 which has two outputs with ON/OFF control for commanding the two-position electrical valves 14, 16 and an output with a command signal variable from a minimum value to a maximum valve in continuous or discrete fashion for the command of the proportion electrical valve 18.

The system according to the present invention comprises a control member 22 which can be operated by the driver to select an operative condition of the electro-hydraulic reverser selected among: neutral, forward travel, and rearward travel. The control member 22 can be constituted by a three-position lever positioned in the control cab of the vehicle, e.g. under the steering wheel.

The system according to the present invention comprises a sensor 24 able to provide an ON/OFF signal indicating the operative state of the braking system. The system further comprises a sensor 26 able to provide a signal indicating the speed of advance of the vehicle, constituted for example by an rpm sensor positioned in the rear part of the transmission.

FIGS. 2 through 8 shows the operating logic of the system when the vehicle is started from a motionless state. The acronyms used in these figures have the following meanings:

EvF: forward travel electrical valve;

EvR: rearward travel electrical valve;

Evp: proportional electrical valve;

i_Evp: intensity of the command signal sent to the proportional electrical valve;

I_contatto: command signal to the proportional electrical valve which determines a state of contact but without transmission of torque of the hydraulic clutch;

v_speed: speed of movement of the vehicle;

brake: state of the vehicle braking system (ON or OFF);

dir: operative position of the command member of the reverser (N=neutral; F=forward travel; R=rearward travel).

Figure 2:
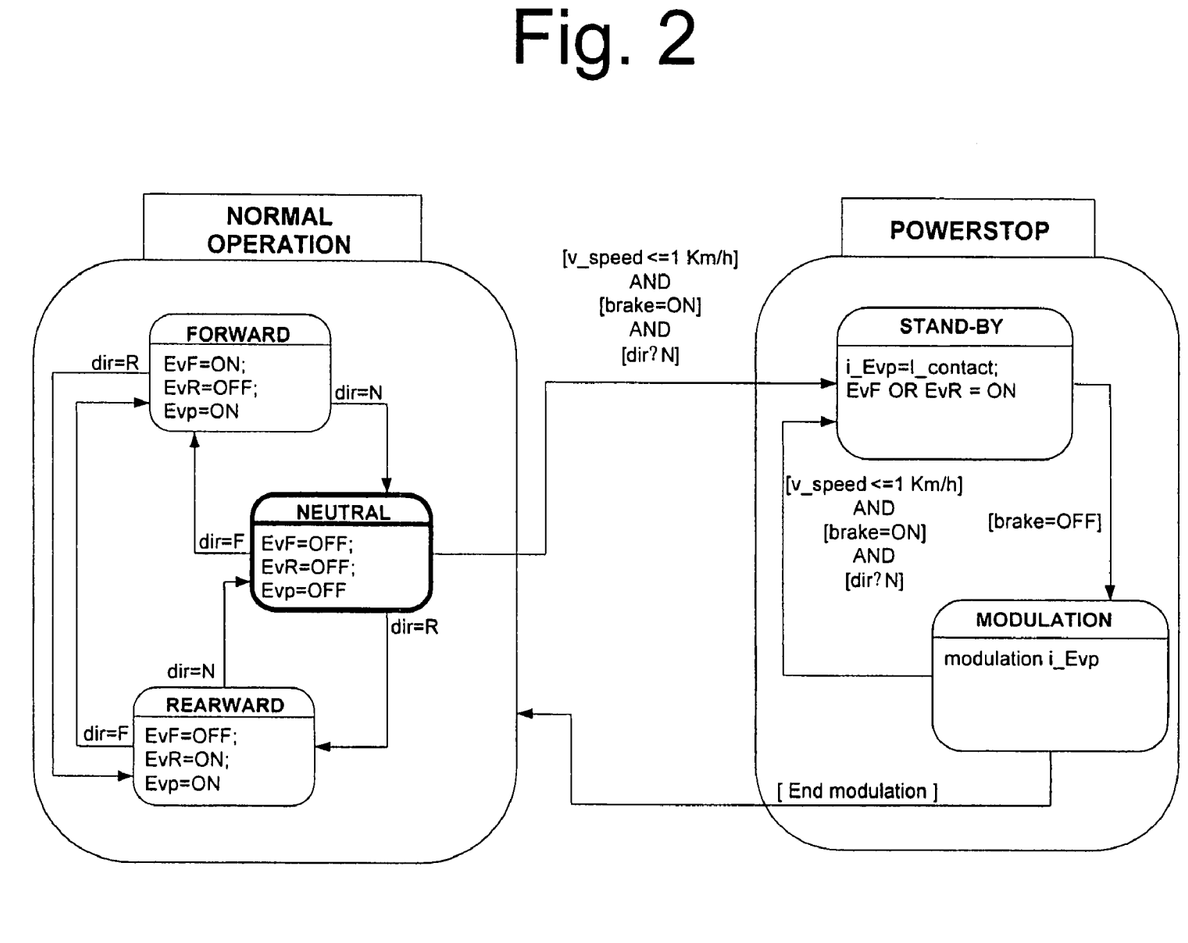
FIGS. 2 through 8 are flow charts which illustrate the logic operation of the system when starting from a motionless condition.

FIG. 2 shows the condition in which the vehicle is motionless and in neutral gear. The electrical valve EvF, EvR and Evp are all in the OFF position.

Figure 3:
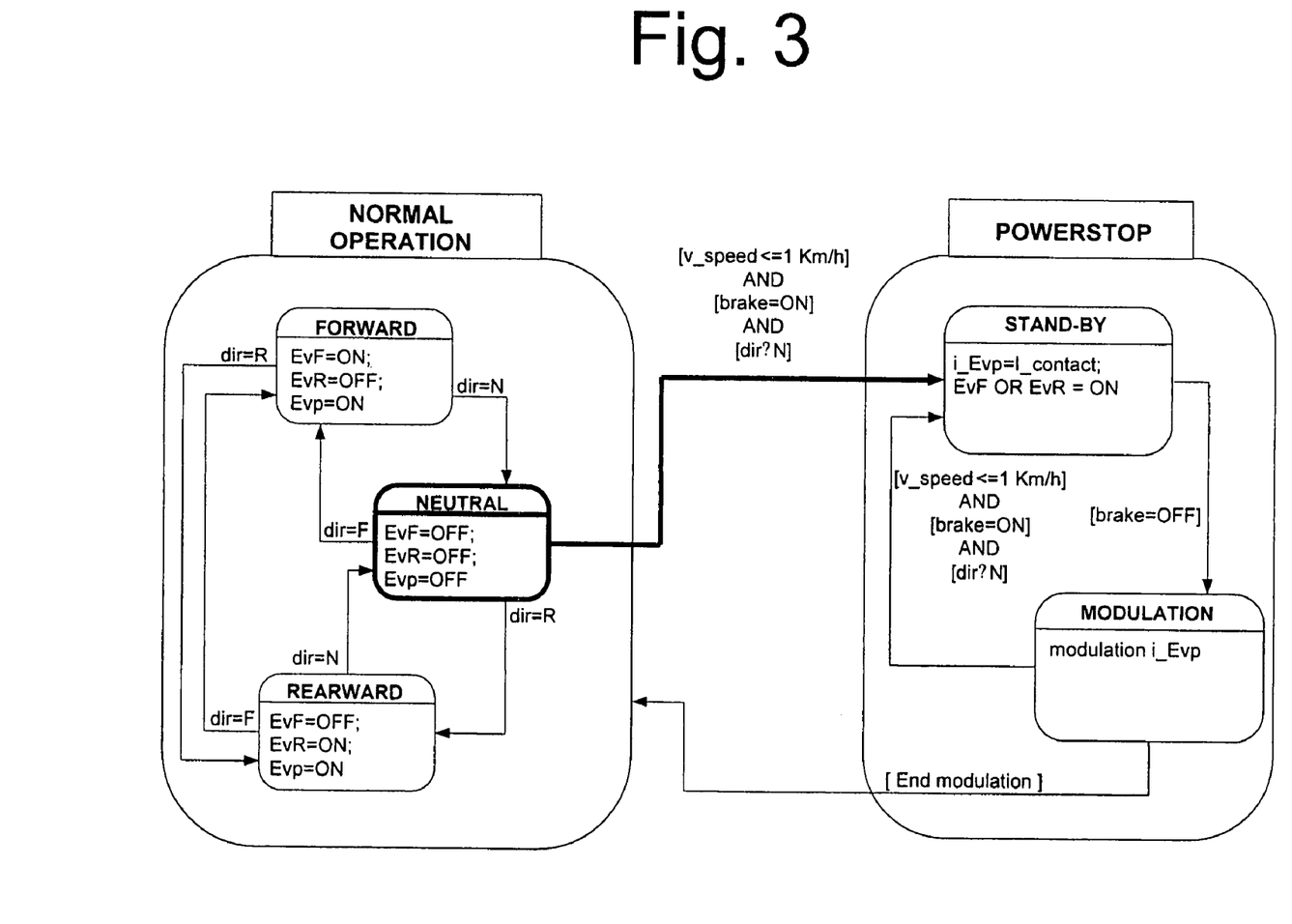

With reference to FIG. 3, in the motionless machine condition the operator presses the brake pedals and then selects a direction of travel (forward or rearward). These conditions place the system in a state defined as stand-by.

Figure 4:
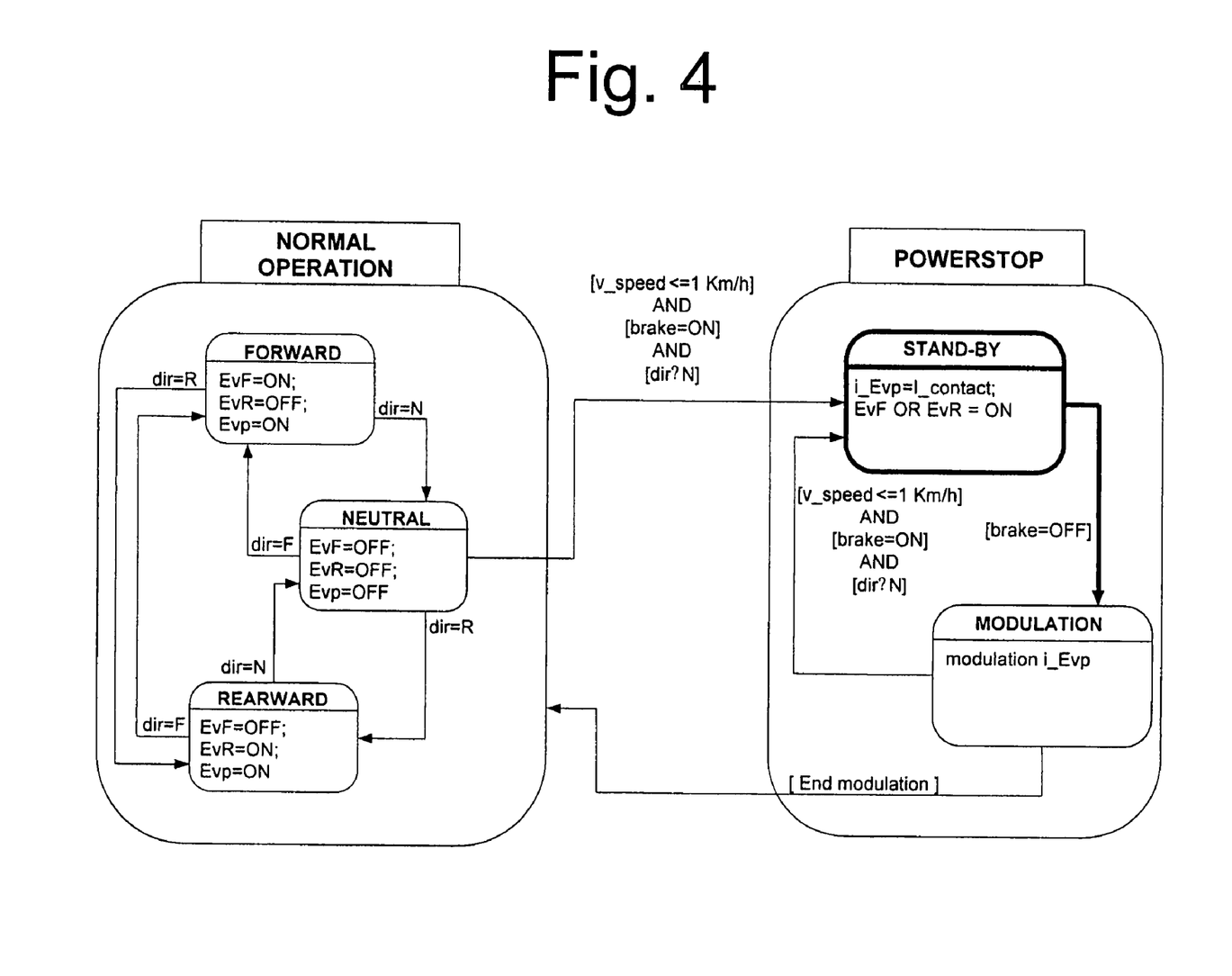

With reference to FIG. 4, in the stand-by state, the electrical valve EvF or EvR of the requested direction is activated and the proportional electrical valve Evp commands a pressure defined as contact pressure, i.e. sufficient to fill the clutch but not to transmit torque.

Figure 5:
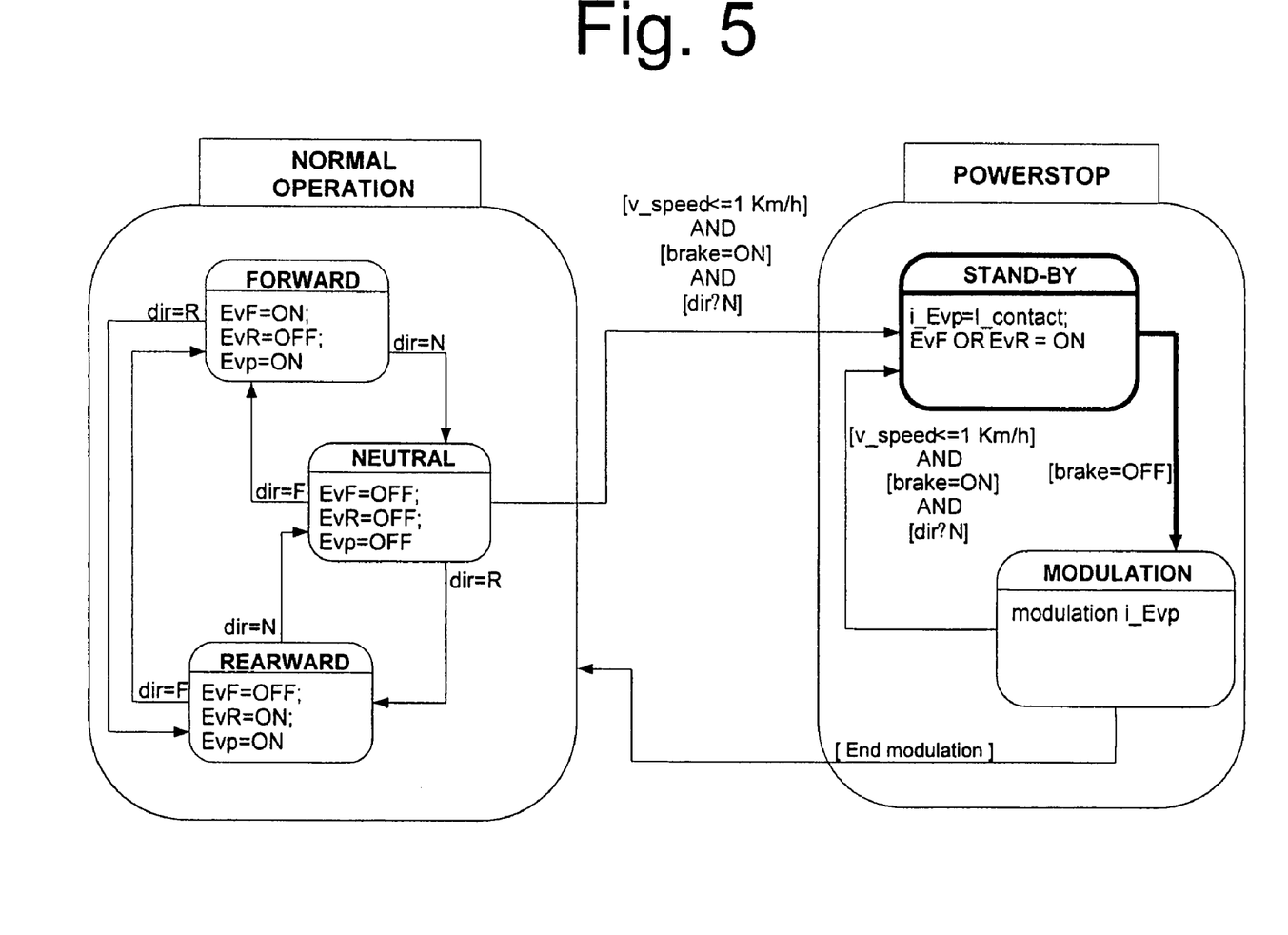

With reference to FIG. 5, when the operator releases the brake pedal, the electronic control unit activates a modulation sub-phase.

Figure 6:
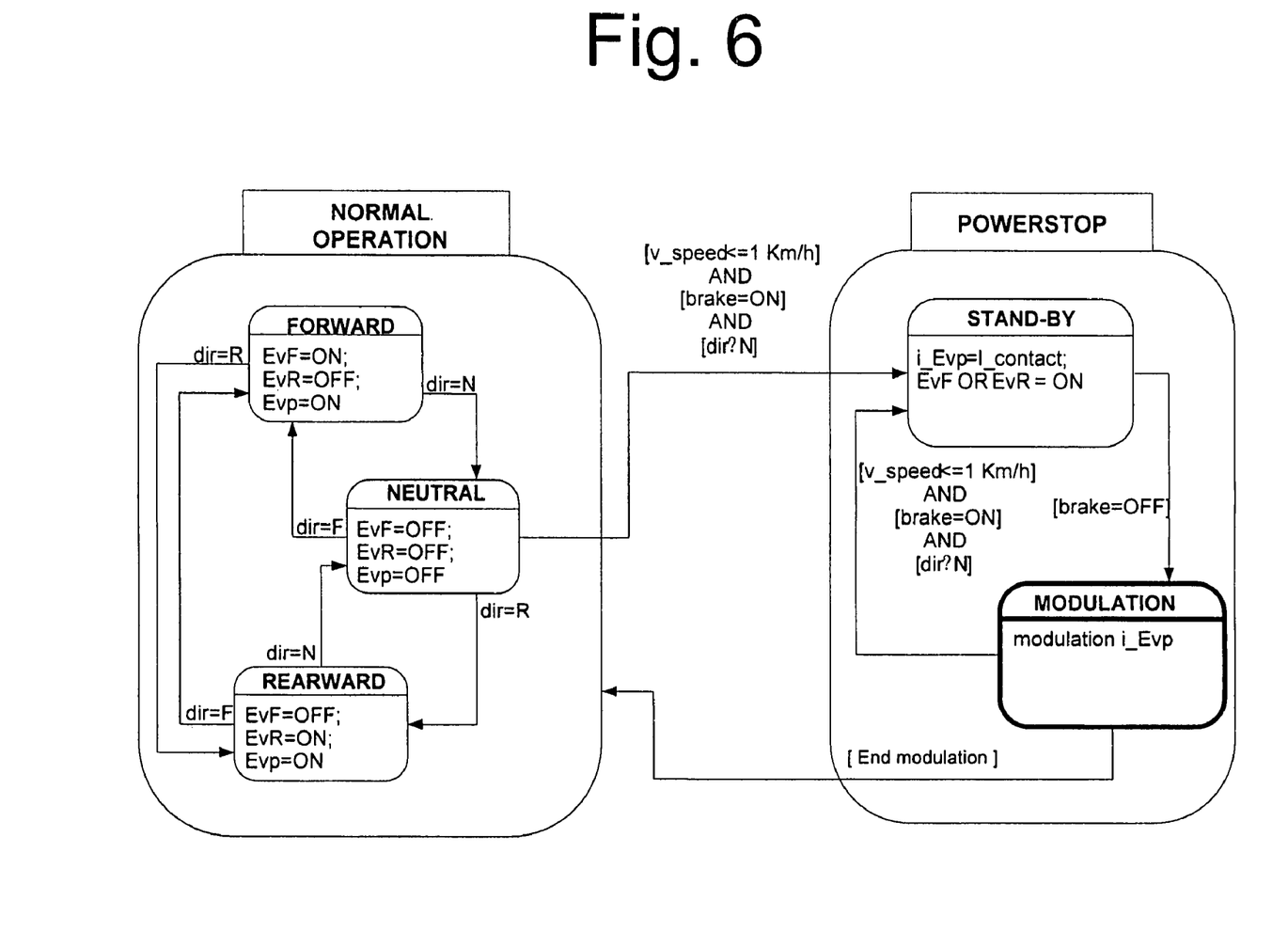

With reference to FIG. 6, the modulation of the reverser clutch provides for a progressive increase in pressure until reaching the maximum pressure.

Figure 7:
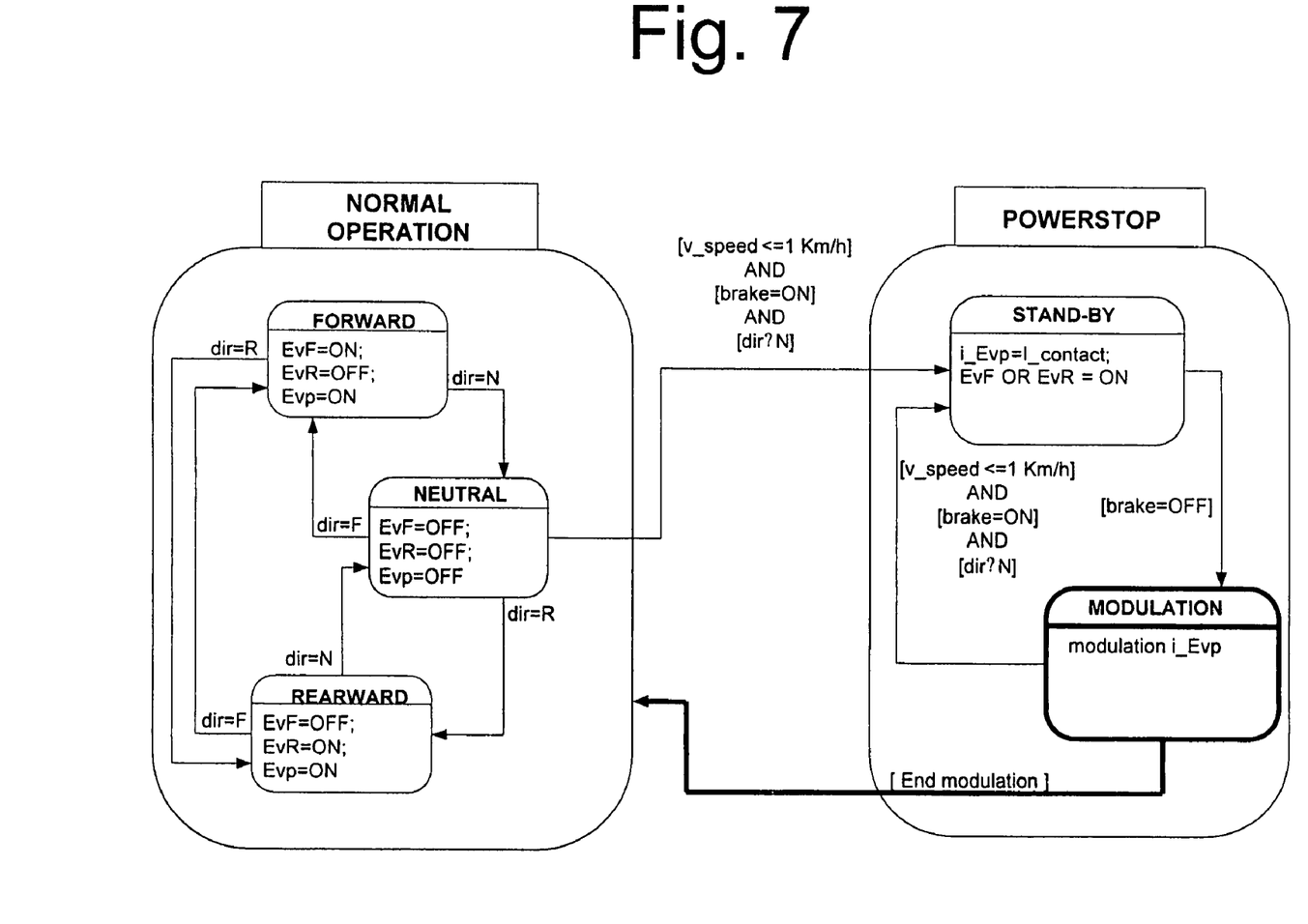

With reference to FIG. 7, the modulation of the reverser clutch provides for a progressive pressure increase until reaching the maximum pressure.

Figure 8:
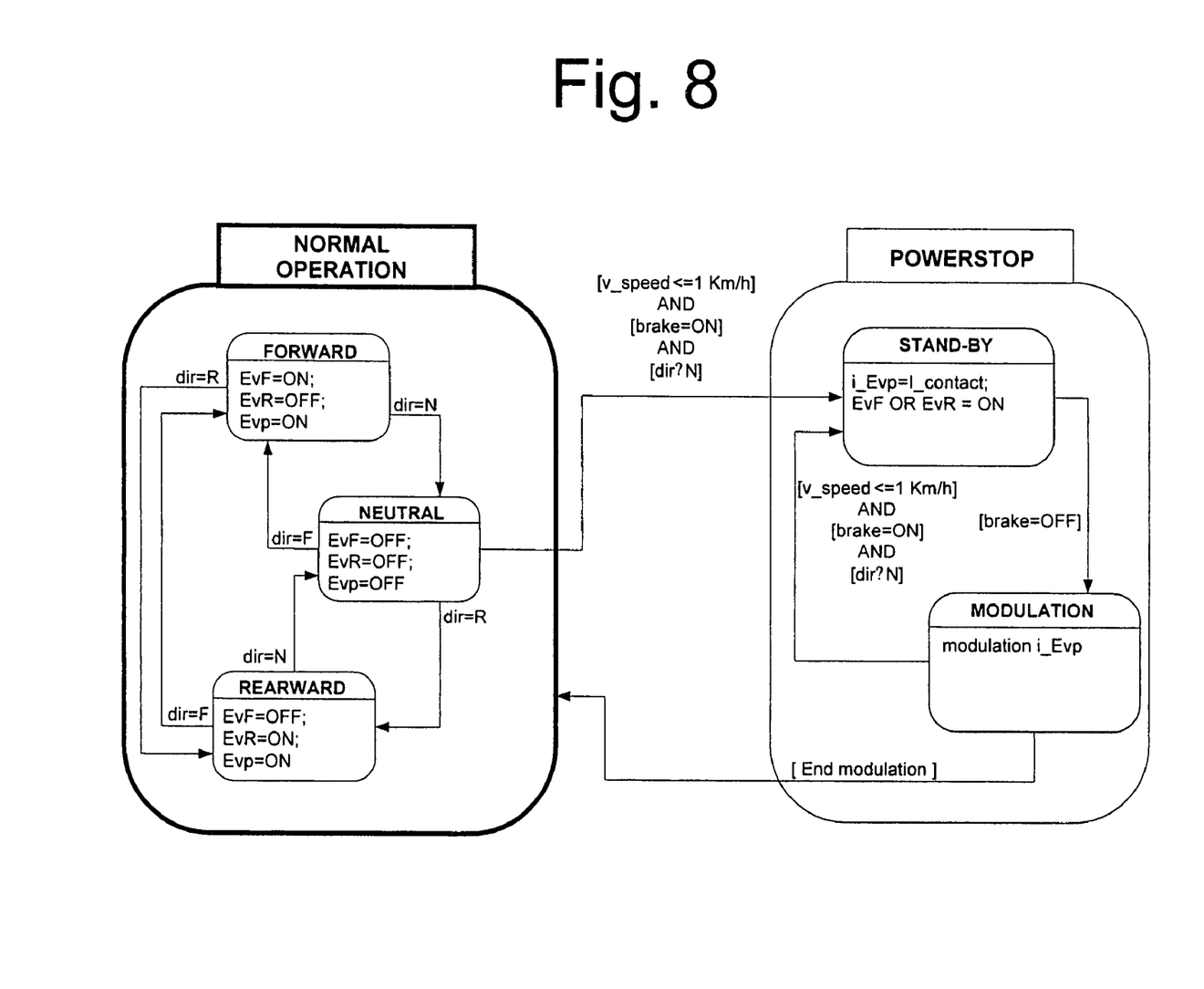

Lastly, FIG. 8 shows the passage of the system to the normal operation mode of the electro-hydraulic reverser, governed by the conventional logic of the position of the reverser command.

FIGS. 9 through 14 illustrate the logic operation of the system during a reversal manoeuvre with temporary stop of the vehicle.

Figure 9:
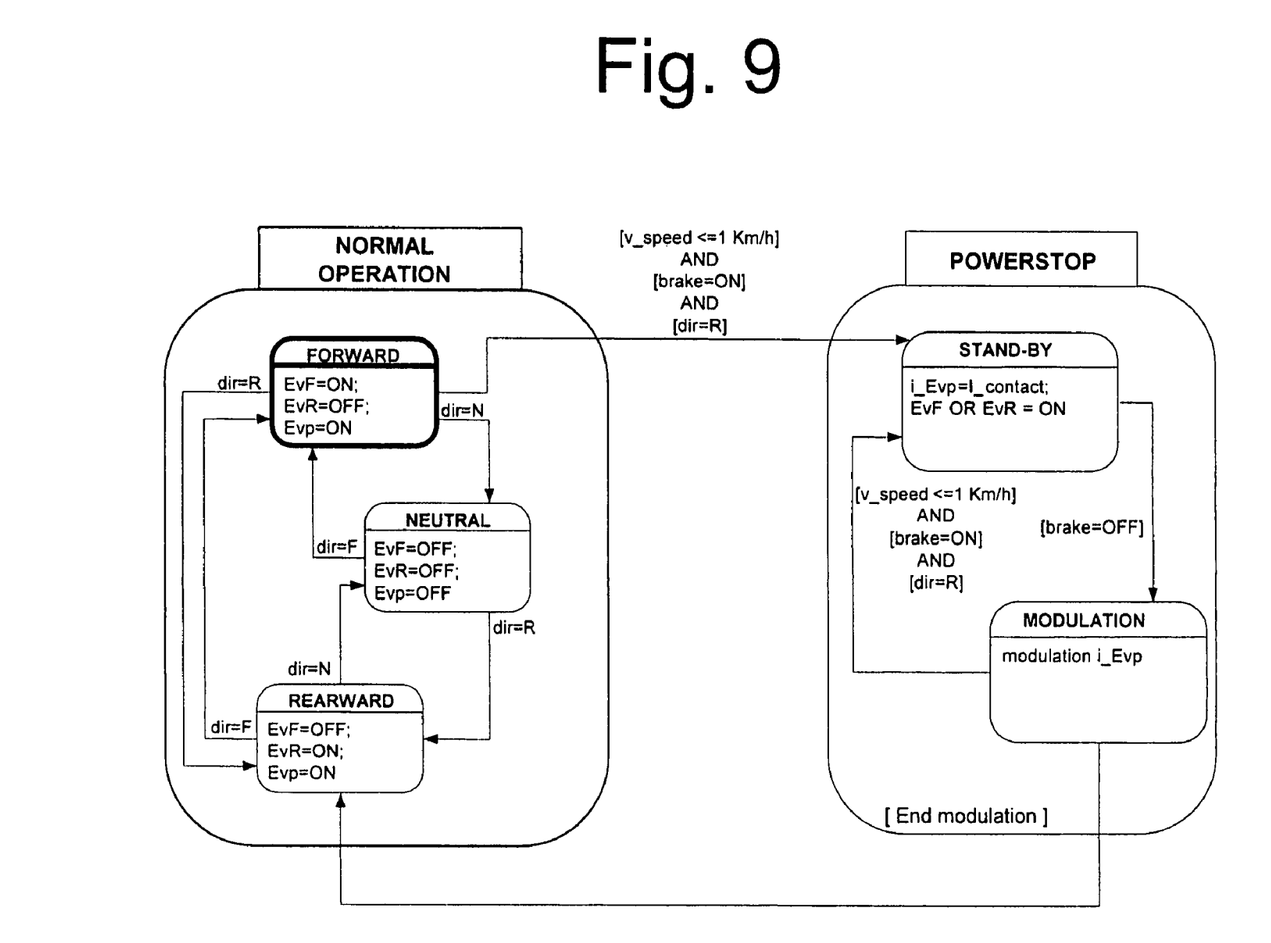
FIGS. 9 through 14 are flow charts which illustrate the logic operation of the system during a reversal manoeuvre with temporary stop of the vehicle.

With reference to FIG. 9, with the vehicle in motion in one direction, e.g. the forward direction, the forward travel electrical valve EvF and the proportional electrical valve Evp are active while the rearward travel electrical valve EvR is inactive.

Figure 10:
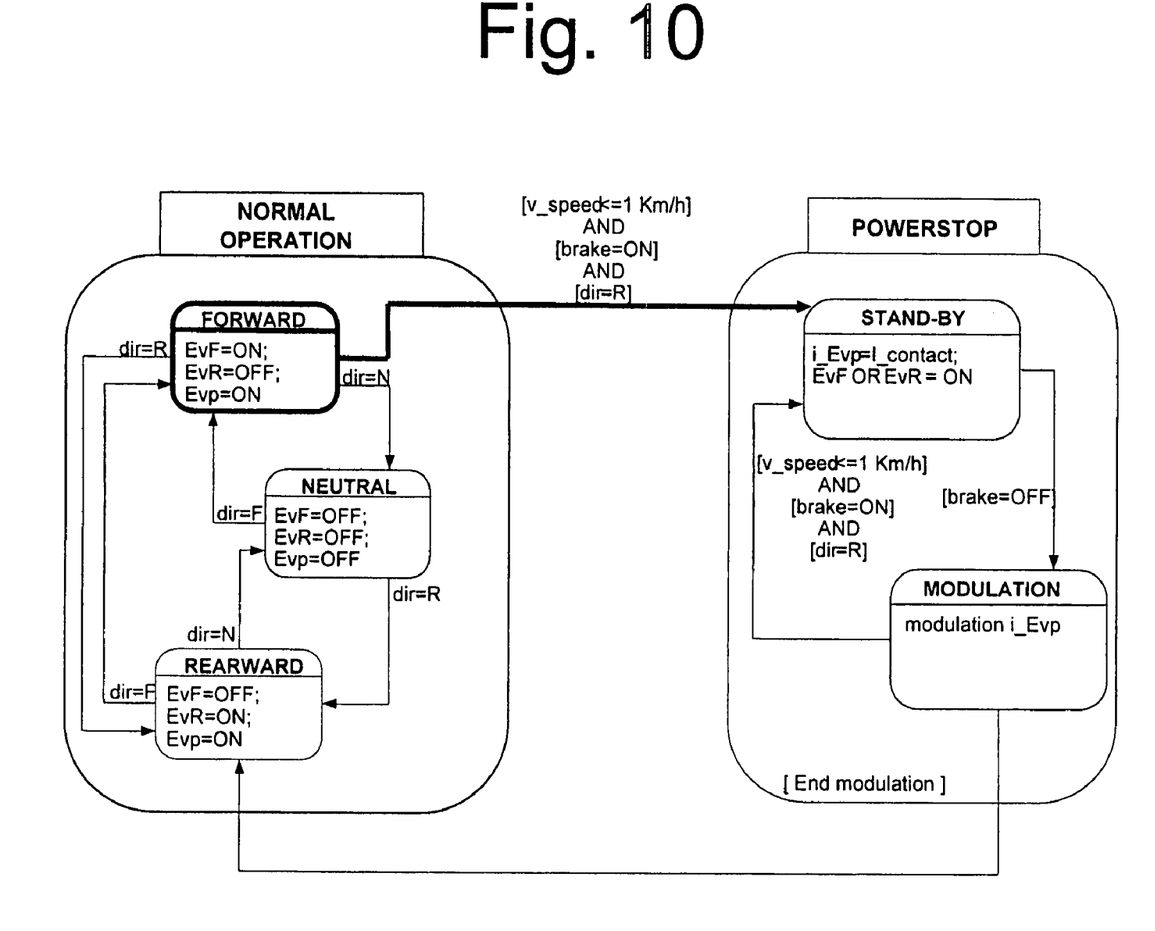

Starting from this condition, the operator activates the control member of the reverser in the opposite direction (in this case the rearward travel) and subsequently presses the brake pedals. As shown in FIG. 10, the electronic control unit places the system in a stand-by state until the control unit verifies whether the vehicle is motionless or substantially stopped (v_speed<=1 Km/h).

Figure 11:
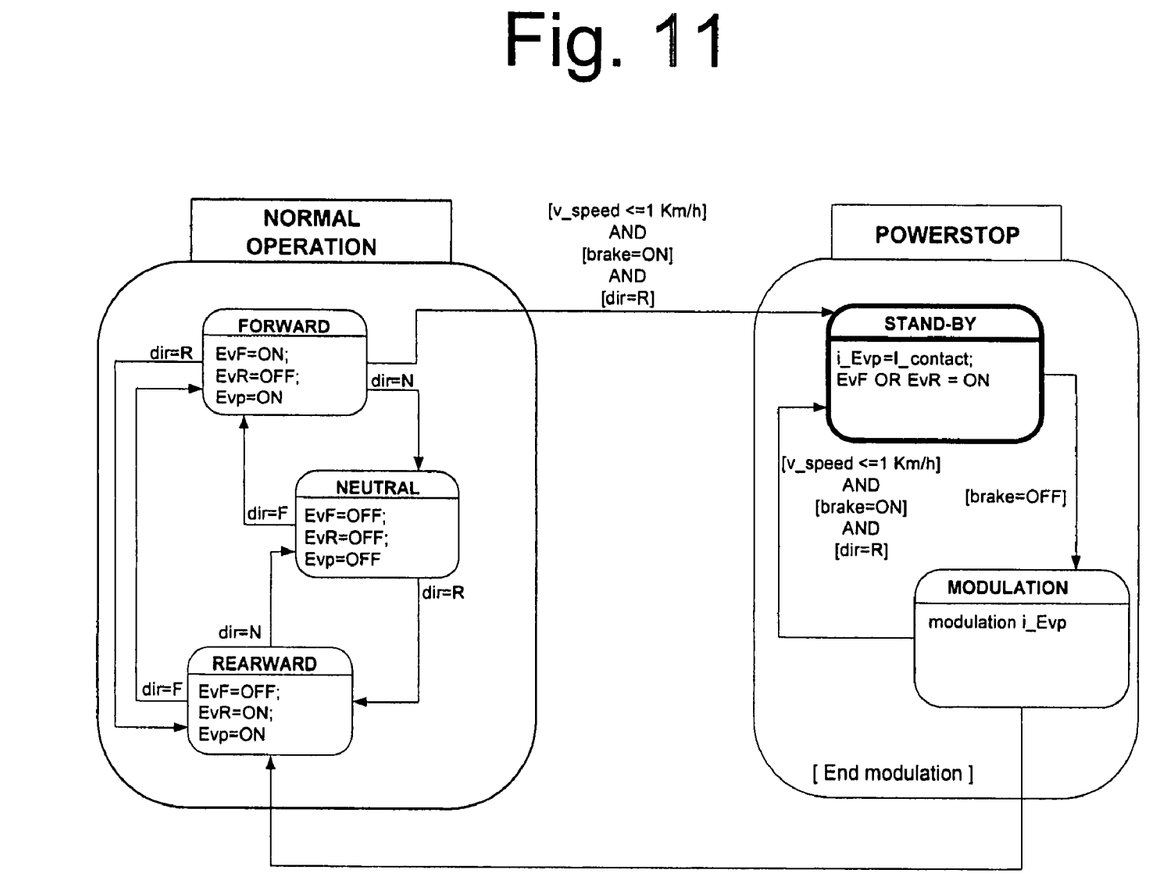

FIG. 11 shows the system in a stand-by state, in which the electrical valve of the requested direction (rearward travel) is activated and the proportional electrical valve commands a contact pressure sufficient to fill the clutch but not sufficient to transmit torque.

Figure 12:
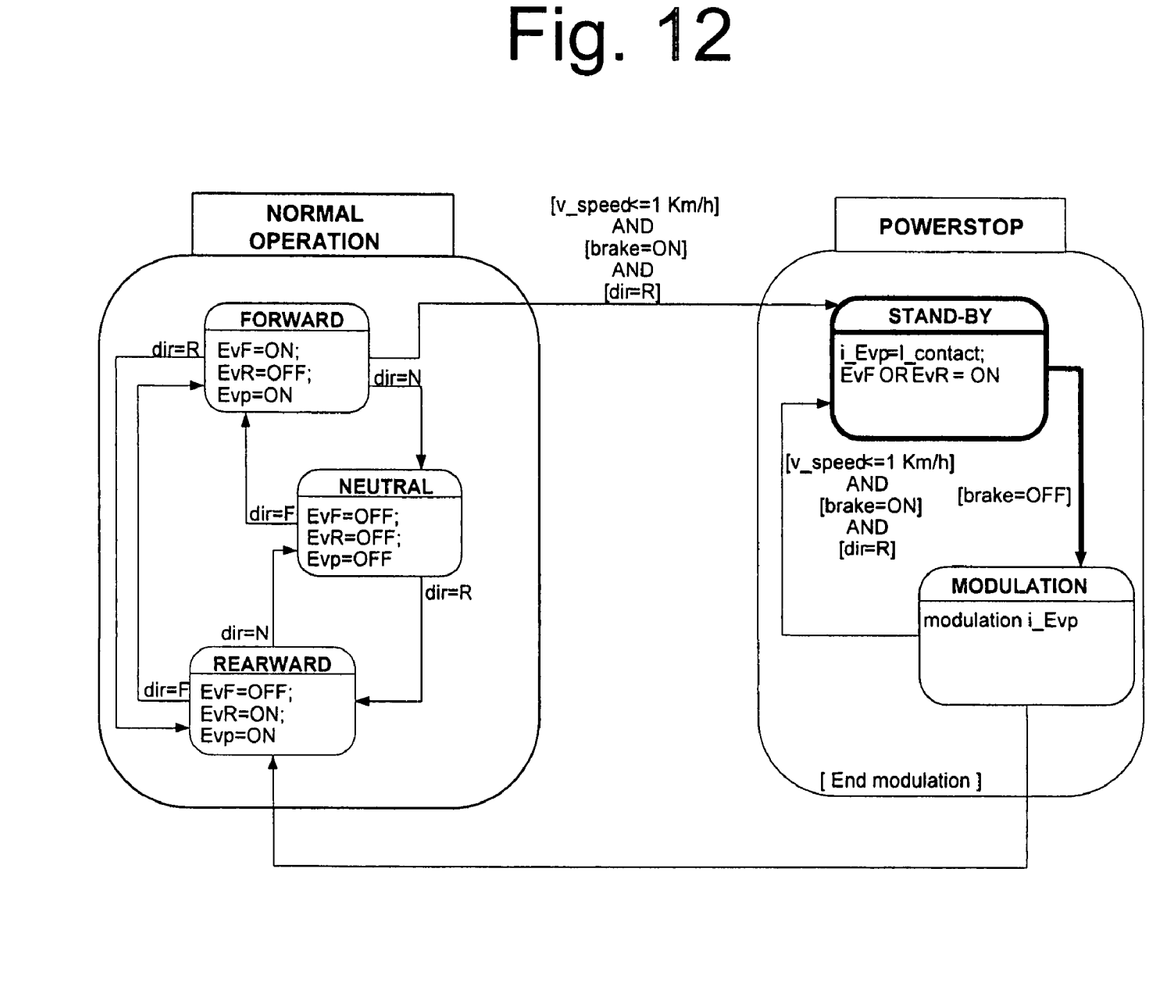

With reference to FIG. 12, when the operator releases the brake pedal, the electronic control unit of the reverser activates the clutch modulation sub-phase.

Figure 13:
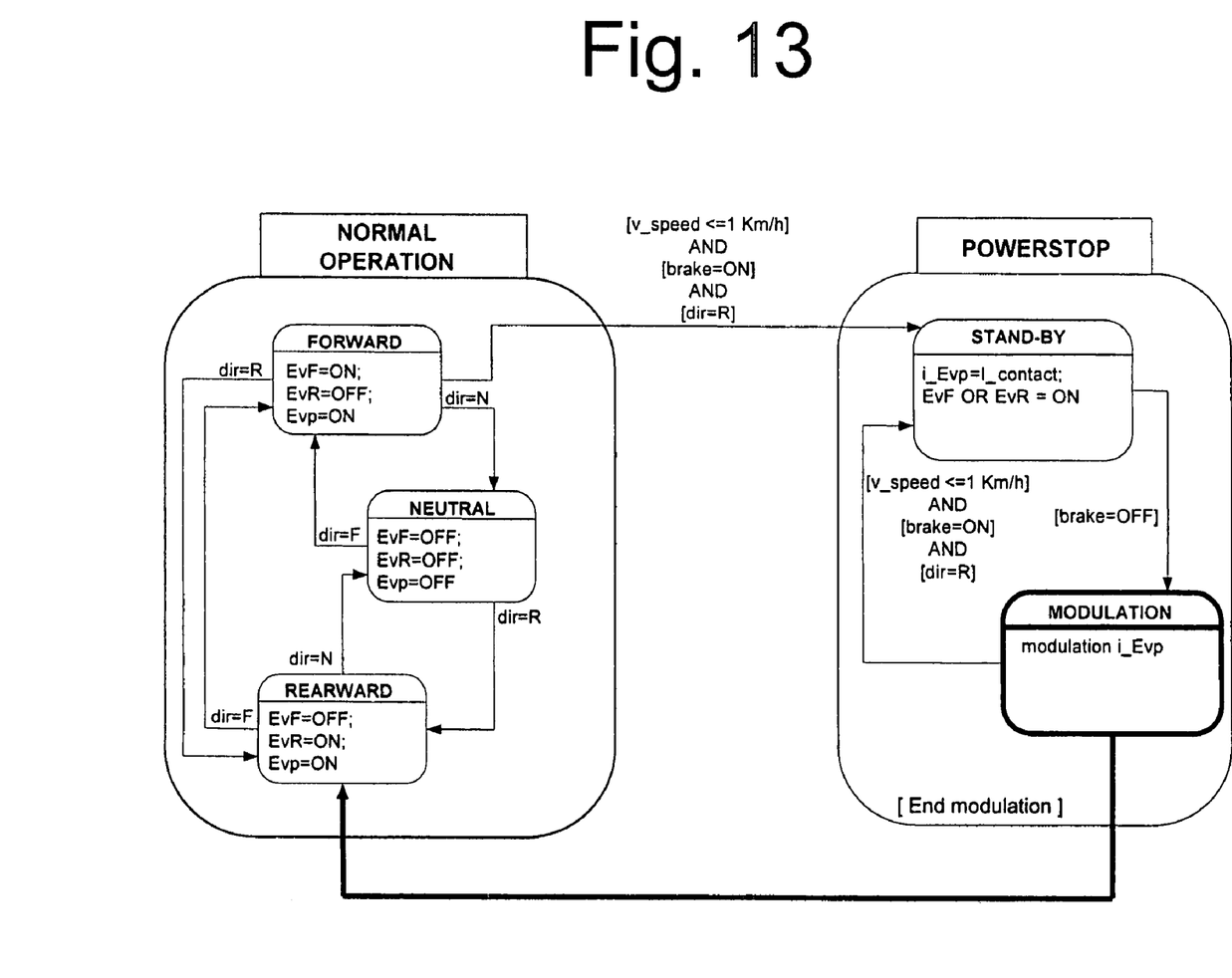

FIG. 13 shows the system during the clutch modulation phase, until reaching the maximum pressure.

Figure 14:
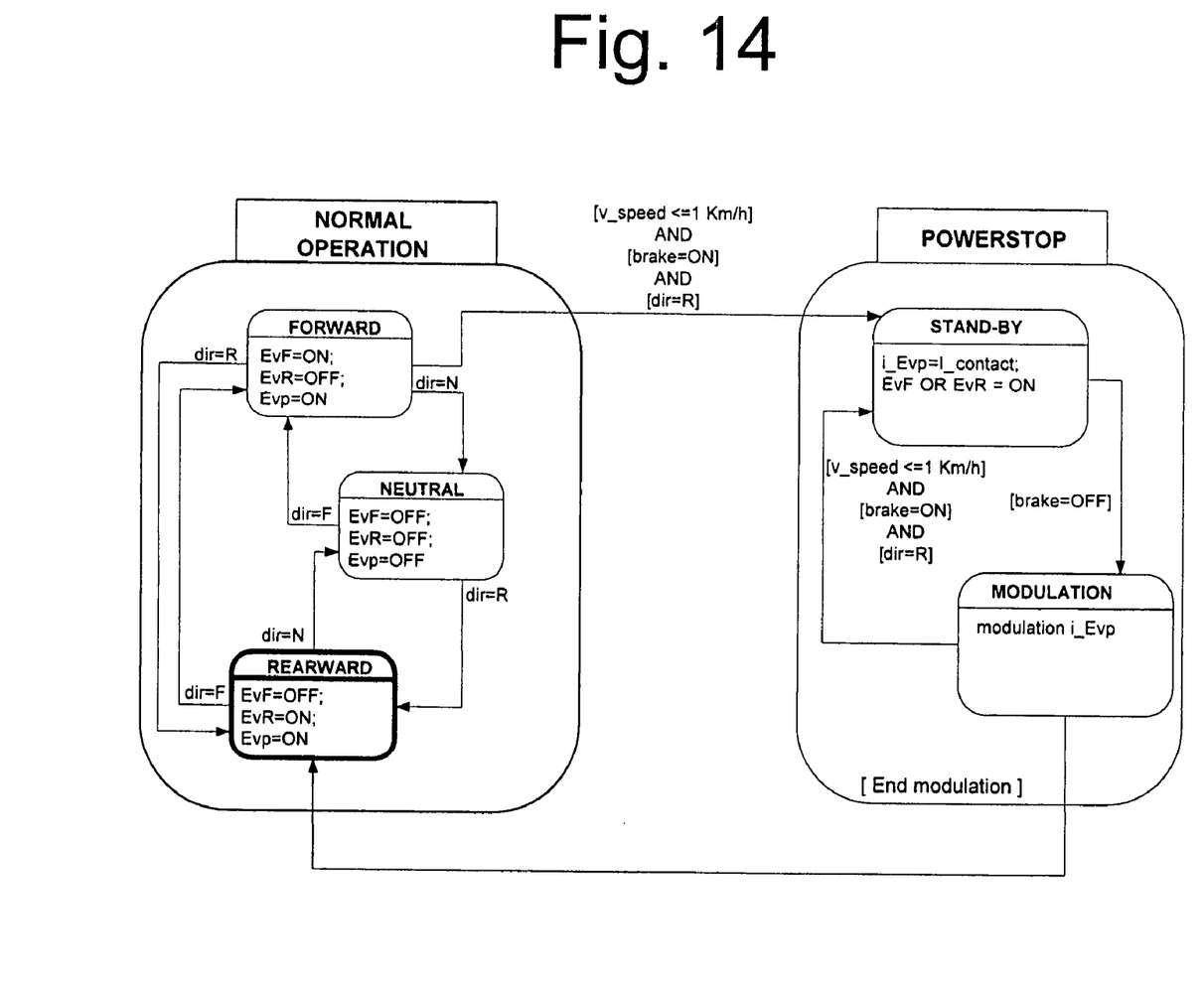

Lastly, as shown in FIG. 14, the vehicle starts again in reverse gear and shifts to the normal operating mode of the electro-hydraulic reverser, governed by the conventional logic of the position of the reverser control member.

Thanks to the system according to the present invention, the vehicle acquires a particular aptitude to execute manoeuvres in very restricted spaces in which it is necessary to suspend the movement of the vehicle for time intervals that are not constant and hence not manageable with the normal time required by the vehicle to reverse its movement and where the use of brakes becomes necessary to quicken manoeuvres.

The ability to interrupt travel simply by braking and to resume travel by merely releasing the brake pedal provides the vehicle with exceptional usability features.

A situation in which the system according to the present invention is very useful is in the use on an agricultural tractor with a front end loader. During the operation of loading a carriage by means of a front end loader with a tractor lacking a system according to the invention, each time the material is unloaded the driver has to interrupt the activity of the hydraulic reverser for a few seconds to rotate the shovel and allow the material to drop into the carriage. With the system according to the invention, the driver needs only to act on the brake pedals to stop the vehicle until the operation of unloading the material from the shovel is completed. Removing the foot from the brake pedal, the tractor will automatically start the reversal manoeuvre.

If the work described above is conducted on hilly terrain or, in general, on non level terrain, without the system according to the invention the driver would be forced to use both the clutch and the brakes. The failure to synchronise the operation of the brake and clutch pedals in a difficult situation like a hilly environment could create safety problems in addition to compromising operator comfort. The system according to the invention adds to the typical advantages of the hydraulic reverser the following advantages and benefits:

use of the brake pedal alone instead of the brake and friction pedals for temporarily stopping the vehicle during the reversal manoeuvre;

simplified operation and reduced stress in repetitive work processes, e.g. while using the loader shovel;

better operation of the vehicle and greater safety;

better operation of the equipment and greater productivity;

electronically controlled clutch engagement and disengagement without any possibility of human error, with consequent better duration and reliability of the clutch assembly.

The invention claimed is:

1. A system for reversing the movement of a vehicle, in particular for an agricultural tractor, comprising:

an electro-hydraulic reverser including a hydraulic clutch and a valve assembly able to activate the clutch in conditions of forward travel or of rearward travel and able to modulate the engagement of the clutch, a control member which can be operated by the driver to select an operative condition of the reverser selected among: neutral, forward travel, and rearward travel, an electronic control unit adapted to receive a first signal indicating the position of said control member, a second signal indicating the operative state of a braking system of the vehicle, and a third signal indicating the speed of the vehicle, the electronic control unit being adapted to control said valve assembly according to said first, second and third signal, so that when the electronic control unit senses that the control member is in forward travel or rearward travel position, and that the vehicle is stopped or substantially stopped and that the braking system is activated, the control unit automatically commands a stand-by state of the electro-hydraulic reverser in which the hydraulic clutch is subjected to a sufficient pressure to fill the clutch but not sufficient to transmit torque and, when the electronic control unit senses that the braking system is deactivated in conditions of a stopped or substantially stopped vehicle and with the control member set in forward travel or rearward travel condition, the electronic control unit automatically commands a modulation phase for the progressive engagement of the hydraulic clutch.

2. The system of claim 1, wherein the electronic control unit commands the stand-by state without an operator moving a clutch pedal of the agricultural tractor.

3. The system of claim 2, wherein the progressive engagement of the hydraulic clutch is achieved without the operator moving the clutch pedal.

4. The system of claim 1, wherein the control member is a gear shift lever.

5. The system of claim 4, wherein the operator operates the hydraulic clutch solely by manipulating a brake pedal and the gear shift lever.

6. A method for controlling an electro-hydraulic reverser of a vehicle including a hydraulic clutch and a valve assembly to set the clutch in neutral, forward travel or rearward travel condition and to modulate the engagement of the clutch, comprising the steps of:

sensing the position of a control member which can be operated by the driver;

indicating an operative condition of the reverser selected among: neutral, forward travel, rearward travel;

sensing the operative state of the braking system of the vehicle;

measuring the speed of movement of the vehicle;

commanding the operative state of the electro-hydraulic reverser automatically according to the sensed conditions;

placing the electro-hydraulic reverser in a stand-by state in which the clutch is subjected to a sufficient hydraulic pressure to fill the chambers of the clutch but not sufficient to transmit torque when the control member indicates an operative position of forward travel or rearward travel, the braking system is activated and the vehicle is stopped or substantially stopped; and modulating the engagement of the hydraulic clutch starting from said stand-by operative state when the deactivated state of the braking system is sensed.

7. The method of claim 6, further comprising achieving the stand-by state without the driver manually manipulating a clutch pedal.

8. The method of claim 7, wherein modulating the engagement of the hydraulic clutch is achieved without the driver manually manipulating a clutch pedal.

9. The method of claim 6, wherein the control member is a gear shift lever.

10. The method of claim 9, further comprising operating the hydraulic clutch solely by manipulating a brake pedal and the gear shift lever.

\* \* \* \* \*